United States Patent
Jou et al.

(10) Patent No.: US 8,121,292 B2
(45) Date of Patent: Feb. 21, 2012

(54) METHOD AND APPARATUS FOR SCRAMBLING INFORMATION BITS ON A CHANNEL IN A COMMUNICATIONS SYSTEM

(75) Inventors: Yu-Cheun Jou, San Diego, CA (US); Yongbin Wei, San Diego, CA (US); Tao Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 565 days.

(21) Appl. No.: 10/085,581

(22) Filed: Feb. 26, 2002

(65) Prior Publication Data

US 2003/0161471 A1    Aug. 28, 2003

(51) Int. Cl.
*H04L 9/00* (2006.01)
(52) U.S. Cl. .................................................. 380/269
(58) Field of Classification Search .................. 380/255, 380/274, 287, 262, 37, 42, 47, 243, 2, 44, 380/26, 8, 36–38, 43, 244, 270; 713/178, 713/155, 189; 370/280, 294, 203, 328, 345, 370/535, 208, 336; 375/237–239, 138; 714/48, 714/52, 55; 455/560, 561, 509, 67.11; 708/250, 708/270
See application file for complete search history.

(56) References Cited

U.S. PATENT DOCUMENTS

| | | | |
|---|---|---|---|
| 4,677,617 A * | 6/1987 | O'Connor et al. | 370/478 |
| 4,791,669 A * | 12/1988 | Kage | 380/46 |
| 4,811,394 A * | 3/1989 | Ragavan et al. | 380/261 |
| 4,817,145 A * | 3/1989 | Gunther | 380/47 |
| 4,901,307 A | 2/1990 | Gilhousen et al. | |
| RE33,189 E * | 3/1990 | Lee et al. | 380/239 |
| 5,060,266 A * | 10/1991 | Dent | 380/274 |
| 5,103,459 A | 4/1992 | Gilhousen et al. | |
| 5,245,661 A * | 9/1993 | Lee et al. | 380/268 |

(Continued)

FOREIGN PATENT DOCUMENTS

EP    0446194 A1 *    3/1991

(Continued)

OTHER PUBLICATIONS

ETSI TS 25.211—Universal Mobile Telecommunications System (UMTS), "Physical channels and mapping of transport channels onto physical channels (FDD)", 3GPP TS 25.211 v. 3.9.0, Release 1999, (Jan. 9, 2009).

(Continued)

*Primary Examiner* — Beemnet Dada
(74) *Attorney, Agent, or Firm* — Howard H. Seo

(57) ABSTRACT

A control channel in a communication system transmits messages in a one or multiple-slot format. To assure consistency of a message, a content quality indicator is included in the message. Because a terminal receiving the message does not know the number of slots comprising the message, the terminal performs blind format determination by testing hypothesis for all slot formats. Unfortunately, the content of certain control messages results in control messages that appear to be valid in a sense that, the computed CRC is equal to the interpreted CRC. Consequently, the mobile station declares a valid control message, and a false-alarm event occurs. Moreover, the same control messages always result in the same false-alarm events. To prevent such repetitive incorrect determination, the content of the message is scrambled by a time-dependent scrambling sequence before transmission. Re-generating the scrambling sequence, and performing inverse to the scrambling then unscrambles the received message.

20 Claims, 6 Drawing Sheets

U.S. PATENT DOCUMENTS

| | | | |
|---|---|---|---|
| 5,321,754 A * | 6/1994 | Fisher et al. | 380/268 |
| 5,504,773 A | 4/1996 | Padovani et al. | |
| 6,348,876 B1 * | 2/2002 | Wei et al. | 340/854.9 |
| 6,487,181 B1 * | 11/2002 | Johnson et al. | 370/311 |
| 6,574,211 B2 * | 6/2003 | Padovani et al. | 370/347 |
| 6,751,205 B2 * | 6/2004 | Menon et al. | 370/328 |
| 6,813,355 B1 * | 11/2004 | Hakaste | 380/270 |
| 6,813,625 B2 * | 11/2004 | Smeets | 708/250 |
| 6,882,727 B1 * | 4/2005 | Vialen et al. | 380/33 |
| 6,909,887 B2 * | 6/2005 | Fauconnier et al. | 455/403 |
| 6,912,228 B1 * | 6/2005 | Dahlman et al. | 370/441 |
| 6,973,189 B1 * | 12/2005 | Bodin | 380/46 |
| 7,639,817 B2 * | 12/2009 | You et al. | 380/270 |
| 2002/0089935 A1 * | 7/2002 | Chan et al. | 370/252 |
| 2002/0172264 A1 * | 11/2002 | Wiberg et al. | 375/147 |

FOREIGN PATENT DOCUMENTS

| | | | |
|---|---|---|---|
| GB | 2294853 | * | 11/1995 |
| WO | WO 97/12461 | * | 9/1996 |

OTHER PUBLICATIONS

ETSI TS 125.212—Universal Mobile Telecommunications System (UMTS). "Multiplexing and channel coding (FDD)", 3GPP TS 25.212 v. 3.8.0, Release 1999. (Jan. 9, 2002).

ETSI TS 125.213—Universal Mobile Telecommunications System (UMTS), "Spreading and modulation (FDD)", 3GPP TS 25.213 v. 3.7.0, Release 1999, (Jan. 1, 2002).

ETSI TS 125.214—Universal Mobile Telecommunication System (UMTS), "Physical layer procedures (FDD)", 3GPP TS 25.214 v. 3.9.0, Release 1999, (Jan. 9, 2002).

3GPP2 C.S0002-A, "Physical Layer Standard for cdma2000 Spread Spectrum Systems—Release A", V6.0 Feb. 9, 2002 (TR 45.5).

3GPP2 C.S0002-A, "cdma High Rate Packet Data Air Interface Specification", V3.0 Dec. 5, 2001 (TIA/IS-856).

TIA/EIA/IS-95-B, "Subscriber Station-Base Station Compatibility Standard for Dual-Mode Wide-Band Spread Spectrum Cellular System", Mar. 1999.

* cited by examiner

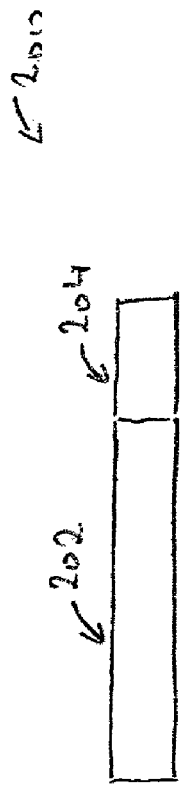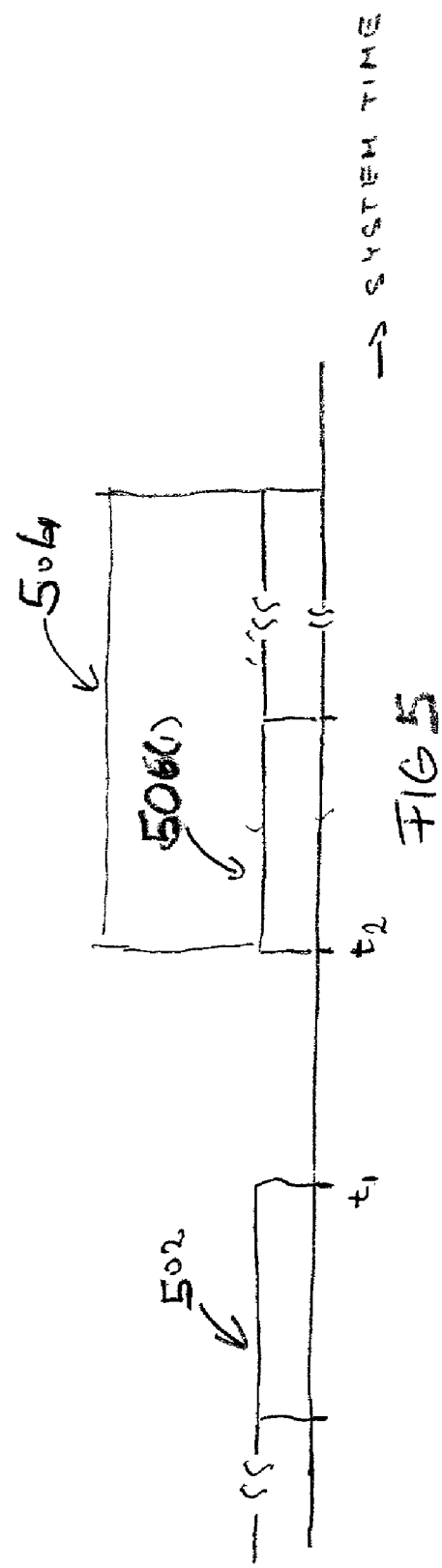

METHOD AND APPARATUS FOR SCRAMBLING INFORMATION BITS ON A CHANNEL IN A COMMUNICATIONS SYSTEM

BACKGROUND

1. Field

The present invention relates generally to communication systems, and more specifically to a apparatus and an apparatus for scrambling information bits on a channel in a communication system.

2. Description of Related Art

Communication systems have been developed to allow transmission of information signals from an origination station to a physically distinct destination station. In transmitting information signal from the origination station over a communication channel, the information signal is first converted into a form suitable for efficient transmission over the communication channel. Conversion, or modulation, of the information signal involves varying a parameter of a carrier wave in accordance with the information signal in such a way that the spectrum of the resulting modulated carrier is confined within the communication channel bandwidth. At the destination station the original information signal is replicated from the modulated carrier wave received over the communication channel. Such a replication is generally achieved by using an inverse of the modulation process employed by the origination station.

Modulation also facilitates multiple-access, i.e., simultaneous transmission and/or reception, of several signals over a common communication channel. Multiple-access communication systems often include a plurality of remote subscriber units requiring intermittent service of relatively short duration rather than continuous access to the common communication channel. Several multiple-access techniques are known in the art, such as time division multiple-access (TDMA), frequency division multiple-access (FDMA), and amplitude modulation multiple-access (AM). Another type of a multiple-access technique is a code division multiple-access (CDMA) spread spectrum system that conforms to the "TIA/EIA/IS-95 Subscriber station-Base Station Compatibility Standard for Dual-Mode Wide-Band Spread Spectrum Cellular System," hereinafter referred to as the IS-95 standard. The use of CDMA techniques in a multiple-access communication system is disclosed in U.S. Pat. No. 4,901,307, entitled "SPREAD SPECTRUM MULTIPLE-ACCESS COMMUNICATION SYSTEM USING SATELLITE OR TERRESTRIAL REPEATERS," and U.S. Pat. No. 5,103,459, entitled "SYSTEM AND APPARATUS FOR GENERATING WAVEFORMS IN A CDMA CELLULAR TELEPHONE SYSTEM," both assigned to the assignee of the present invention.

A multiple-access communication system may be a wireless or wire-line and may carry voice and/or data. An example of a communication system carrying both voice and data is a system in accordance with the IS-95 standard, which specifies transmitting voice and data over the communication channel. A apparatus for transmitting data in code channel frames of fixed size is described in detail in U.S. Pat. No. 5,504,773, entitled "APPARATUS AND APPARATUS FOR THE FORMATTING OF DATA FOR TRANSMISSION", assigned to the assignee of the present invention. In accordance with the IS-95 standard, the data or voice is partitioned into code channel frames that are 20 milliseconds wide with data rates as high as 14.4 Kbps. Additional examples of a communication systems carrying both voice and data comprise communication systems conforming to the "3rd Generation Partnership Project" (3GPP), embodied in a set of documents including Document Nos. 3G TS 25.211, 3G TS 25.212, 3G TS 25.213, and 3G TS 25.214 (the W-CDMA standard), or "TR-45.5 Physical Layer Standard for cdma2000 Spread Spectrum Systems" (the IS-2000 standard).

In a multiple-access communication system, communications between users are conducted through one or more base stations. A first user on one subscriber station communicates to a second user on a second subscriber station by transmitting data on a reverse link to a base station. The base station receives the data and can route the data to another base station. The data is transmitted on a forward link of the same base station, or the other base station, to the second subscriber station. The forward link refers to transmission from a base station to a subscriber station and the reverse link refers to transmission from a subscriber station to a base station. Likewise, the communication can be conducted between a first user on one mobile subscriber station and a second user on a landline station. A base station receives the data from the user on a reverse link, and routes the data through a public switched telephone network (PSTN) to the second user. In many communication systems, e.g., IS-95, W-CDMA, IS-2000, the forward link and the reverse link are allocated separate frequencies.

An example of a data only communication system is a high data rate (HDR) communication system that conforms to the TIA/EIA/IS-856 industry standard, hereinafter referred to as the IS-856 standard. This HDR system is based on a communication system disclosed in co-pending application Ser. No. 08/963,386, entitled "APPARATUS AND APPARATUS FOR HIGH RATE PACKET DATA TRANSMISSION," filed Nov. 3, 1997, assigned to the assignee of the present invention. The HDR communication system defines a set of data rates, ranging from 38.4 kbps to 2.4 Mbps, at which an access point (AP) may send data to a subscriber station (access terminal, AT). Because the AP is analogous to a base station, the terminology with respect to cells and sectors is the same as with respect to voice systems.

In a multiple-access communication system, communications between users are conducted through one or more base stations. A first user on one subscriber station communicates to a second user on a second subscriber station by transmitting data on a reverse link to a base station. The base station receives the data and can route the data to another base station. The data is transmitted on a forward link of the same base station, or the other base station, to the second subscriber station. The forward link refers to transmission from a base station to a subscriber station and the reverse link refers to transmission from a subscriber station to a base station. Likewise, the communication can be conducted between a first user on one mobile subscriber station and a second user on a landline station. A base station receives the data from the user on a reverse link, and routes the data through a public switched telephone network (PSTN) to the second user. In many communication systems, e.g., IS-95, W-CDMA, IS-2000, the forward link and the reverse link are allocated separate frequencies.

Some service providers may be disadvantaged by the need to deploy a predominantly voice communication system, e.g., an IS-2000 revision 0 communication system on one carrier frequency, and a HDR communication system, e.g., IS-856 communication system on a separate carrier frequency. Such a disadvantage may arose from limited spectrum availability, insufficient customer base, business objectives or other reasons known to one of ordinary skills in the art. Consequently, the "3rd Generation Partnership Project 2" (3GPP2) has started to develop a standard for enabling voice and high rate data communication on one carrier frequency. Such a system is described in a draft known as Release C of cdma2000 (hereinafter referred to as Draft).

The Draft specifies a apparatus of allowing voice users to utilize the forward channels defined by the IS-2000 standard. In the excess capacity, data users are served on contain up to two Forward Packet Data Channels (F-PDCH). Therefore, the F-PDCH is used to transmit data user information from a base station to the mobile stations. The user data are transmitted in packets called encoder packets. Each encoder packet is encoded, scrambled, and interleaved. Some or all of the interleaved symbols then form sub-packets, which are modulated and de-multiplexed into a variable number of in-phase and quadrature pairs of parallel streams. The modulation can comprise a quadrature phase-shift keying (QPSK), eight phase-shift keying (8-PSK), or sixteen Quadrature Amplitude Modulation (16-QAM). The number of streams varies in accordance with the demands of the voice users and data users. Each parallel streams is encoded with a distinct 32-ary Walsh function. The Walsh-coded symbols of all the in-phase streams are summed to form a single in-phase stream, and the Walsh-coded symbols of all the quadrature streams are summed to form a single quadrature stream. The resulting in-phase and quadrature streams are quadrature spreaded and transmitted. The F-PDCH is shared by mobile stations based on time multiplexing, thus transmitting information to one specific mobile station at a time.

As follows from the above description, the modulation format of the F-PDCH is variable. Consequently, to enable a mobile station to receive and process the F-PDCH, the base station also transmits control messages on a Forward Packet Data Control Channel (F-PDCCH) transmitted in parallel with the F-PDCH as illustrated in FIG. 1. The control message comprises information required by the subscriber station for correct reception of the F-PDCH, e.g., an identifier of a subscriber station for which the F-PDCH is intended to, a modulation format of the F-PDCH, and other information as specified in the Draft. Because the amount of data that the F-PDCH transmits varies, e.g., with channel conditions, amount of data to be transmitted, the time for transmission $(t_2-t_1)$ varies. The transmission time can be expressed in units of slots, a slot being a 1.25 ms unit. In accordance with the Draft specifications, the slot-format comprises one-slot, two-slots or four-slots. The slot-format of the F-PDCCH is the same as the slot-format of the F-PDCH.

In one embodiment, the F-PDCCH utilizes control messages of length of 21 bits. To assure consistency of control message content, a content quality indicator is computed, and appended to the control message. In one embodiment, the content quality indicator comprises a cyclic redundancy check (CRC). A conceptual structure of an exemplary F-PDCCH control message 200 is illustrated in FIG. 2. The control message 200 comprises 21 bits comprising the information bits of a control message content 202, and 8 bits comprising a quality indicator 204.

A conceptual structure of an exemplary F-PDCCH 300 is illustrated in FIG. 3. The 21 bits of input data 302, comprising the content control message, are concatenated with 8 error detection encoder bits in block 306. The bit stream is further concatenated with 8 encoder tail bits in block 308, and encoded in block 310. In one embodiment, the encoder is a convolutional encoder, well known in the art, with constraint length 9 and rate ½, ⅓, or ¼. Depending on the slot-format a particular encoding rate is selected, i.e., ½ rate for the one-slot format, ⅓ rate for the two-slot format, and ¼ rate for the four-slot format. The encoded symbols are provided to block 312, which adjusts length of the encoded symbols for further processing by puncturing/repeating some symbols to generate 48 symbols for the one-slot format, 96 symbols for the two-slot format, and 192 symbols for four-slot format control message. The symbols are provided to a block interleaver 314. The interleaved symbols are then provided to a quadrature-phase shift keying (QPSK) modulator 316. The In-phase (I) and quadrature-phase (Q) outputs of the QPSK modulator 316 are spreaded by a Walsh code (W) in spreaders 318(I) and 318(Q) and provided to a transmitter (not shown).

One of ordinary skills in the art understands that a particular embodiment of the F-PDCCH has been described for tutorial purposes. Consequently, other embodiments are contemplated. In particular, other encoders, interleavers, modulators, and spreading codes known to one of ordinary skills in the art can be used.

The control message, transmitted by the base station is received at a mobile station. The mobile station uses an inverse of the F-PDCCH processing as described in reference to FIG. 3, to recover the 21 bits comprising the control message. Because the mobile station has no information of how many slots comprises the control message, the mobile station performs the inverse of the F-PDCCH processing under the assumption that the last slot received comprises a control message that is transmitted in the one-slot format. Thus, the mobile station computes a CRC from the first 21 bits of the decoded output (ref. 204 of FIG. 2), which the mobile station interprets as the information bits, and compares the computed CRC with the last 8 bits of the decoded output, (ref. 204 of FIG. 2), which the mobile station interprets as the CRC. If the computed CRC is equal to the interpreted CRC, the mobile station declares a valid control message. If the computed CRC is not equal to the interpreted CRC, the mobile station performs the inverse of the F-PDCCH processing under the assumption that the last two slots received comprise a control message that was transmitted in the two-slot format, and determines whether the CRC checks as described in the above. If the computed CRC is equal to the interpreted CRC, the mobile station declares a valid control message. If the computed CRC is not equal to the interpreted CRC, the mobile station performs the inverse of the F-PDCCH processing under the assumption that the last four slots comprise a control message that is transmitted in the four-slot format, and determines whether the CRC checks as described in the above. If the computed CRC is equal to the interpreted CRC, the mobile station declares a valid control message. If the computed CRC is not equal to the interpreted CRC, the mobile station declares that no valid control message is found. The mobile station then waits until next slot is received and repeats the above process.

The above-described procedure may yield an incorrect determination of control message slot format. For example, assume that a control message is a two-slot message. Given the above described procedure, the mobile station performs the inverse of the F-PDCCH processing under an assumption that the control message is transmitted in a one-slot format, and interprets the first 21 bits of the decoded output as message content 202 (of FIG. 2), and the remaining 8 bits as a quality indicator 204 (of FIG. 2). Unfortunately, the content of certain control messages sometimes results in control messages that appear to be valid in a sense that, the computed CRC is equal to the interpreted CRC. Consequently, the mobile station declares a valid control message, and a false-alarm event occurs.

Because the same control message contents transmitted on the F-PDCCH are repeated from time to time, there is likelihood that the information bits comprising the message will cause repetitive false-alarm events. Therefore, there is a need in the art for a apparatus an apparatus preventing such repetitive incorrect determination of control message content to happen.

Although the background of the invention was described for pedagogical reasons in terms of a control channel of a communication system in accordance with the Draft, one of ordinary skill in the art will understand that the teaching is applicable to any system providing control messages on any control channel.

SUMMARY OF THE INVENTION

In one aspect of the present invention, a apparatus for generating scrambling sequence in a communications system at a first station is disclosed. The apparatus comprises determining a metric of system time and determining the scrambling sequence in accordance with the metric of system time.

In another aspect of the present invention, a apparatus for generating unscrambling sequence in a communications system at a second station is disclosed. The apparatus comprises determining a metric of system time, and determining the unscrambling sequence in accordance with the metric of system time.

In another aspect of the present invention, a apparatus for communicating information bits from a first terminal to a second terminal in a communications system is disclosed. The apparatus comprises determining a metric of system time, determining the scrambling sequence in accordance with the metric of system time, and scrambling information bits with the scrambling sequence at the first terminal. The receiving terminal determines a metric of system time, an unscrambling sequence in accordance with the metric of system time, and unscrambles information bits with the unscrambling sequence.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIG. 2 illustrates conceptual structure of F-PDCH control message with a quality indicator;

FIG. 5 illustrates a timing diagram for slot index generation;

DETAILED DESCRIPTION OF THE SPECIFIC EMBODIMENTS

Definitions

Figure 1:
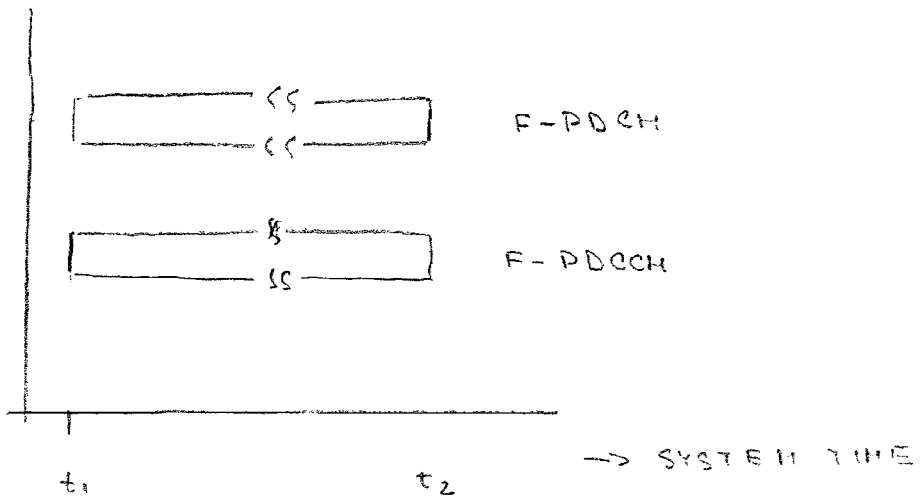
FIG. 1 illustrates a transmission alignment of F-PDCH and F-PDCCH.

The word "exemplary" is used exclusively herein to mean "serving as an example, instance, or illustration." Any embodiment described herein as "exemplary" is not necessarily to be construed as preferred or advantageous over other embodiments.

The term packet is used exclusively herein to mean a group of bits, including data (payload) and control elements, arranged into a specific format. The control elements comprise, e.g., a preamble, a quality metric, and others known to one skilled in the art. Quality metric comprises, e.g., a cyclical redundancy check (CRC), a parity bit, and others known to one skilled in the art.

The term access network is used exclusively herein to mean a collection of access points (AP) and one or more access point controllers. The access network transports data packets between multiple access terminals (AT). The access network may be further connected to additional networks outside the access network, such as a corporate intranet or the Internet, and may transport data packets between each access terminal and such outside networks.

The term base station, referred to herein as an AP in the case of an HDR communication system, is used exclusively herein to mean the hardware with which subscriber stations communicate. Cell refers to the hardware or a geographic coverage area, depending on the context in which the term is used. A sector is a partition of a cell. Because a sector has the attributes of a cell, the teachings described in terms of cells are readily extended to sectors.

The term subscriber station, referred to herein as an AT in the case of an HDR communication system, is used exclusively herein to mean the hardware with which an access network communicates. An AT may be mobile or stationary. An AT may be any data device that communicates through a wireless channel or through a wired channel, for example using fiber optic or coaxial cables. An AT may further be any of a number of types of devices including but not limited to PC card, compact flash, external or internal modem, or wireless or wireline phone. An AT that is in the process of establishing an active traffic channel connection with an AP is said to be in a connection setup state. An AT that has established an active traffic channel connection with an AP is called an active AT, and is said to be in a traffic state.

The term communication channel/link is used exclusively herein to mean a single route over which a signal is transmitted described in terms of modulation characteristics and coding, or a single route within the protocol layers of either the AP or the AT.

The term reverse channel/link is used exclusively herein to mean a communication channel/link through which the AT sends signals to the AP.

The term forward channel/link is used exclusively herein to mean a communication channel/link through which an AP sends signals to an AT.

The term puncture is used exclusively herein to mean deletion of data at certain position of a data stream.

DESCRIPTION

Base Station Processing

Figure 4:
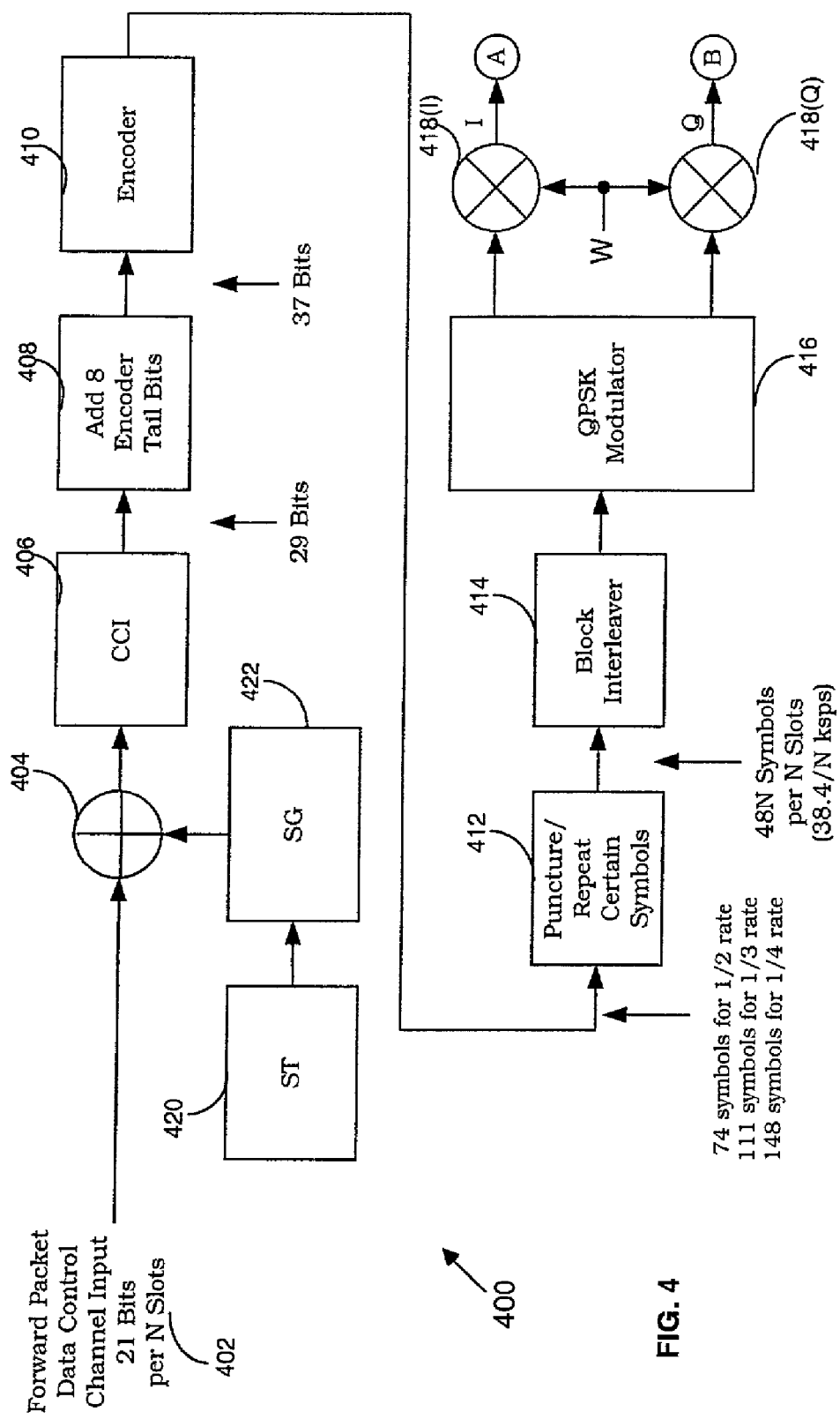
FIG. 4 illustrates a conceptual diagram of an exemplary scrambling of the information bits of control message transmitted on a control channel.

FIG. 4 illustrates a conceptual diagram of an exemplary apparatus capable of performing scrambling the information bits of control message transmitted on a control channel, e.g., an F-PDCCH, in accordance with embodiments of the present invention.

The 21 bits of input data 402, comprising the content of control message, are provided into block 404. The block 404 scrambles the input data 402 by a 21-bit sequence, provided by a sequence generator 422. The sequence generator 422 can comprise e.g., a hash function, a linear function, or any other means known to one skilled in the art, which provides a 21 bit long pseudo-random sequence in response to the input. In one embodiment, the block 404 performs scrambling by a bit-wise exclusive-OR of the input data 402 with the sequence 422. The scrambled sequence; therefore, comprises 21 bit and is provided to block 406. The block 406 concatenates the scrambled sequence with 8 error detection encoder bits. The bit stream is further concatenated with 8 encoder tail bits in block 408, and encoded in block 410. In one embodiment, the encoder is a convolutional encoder, well known in the art, with constraint length 9 and rate ½, ⅓, or ¼. Depending on the slot-format a particular encoding rate is selected, i.e., ½ rate for the one-slot format, ⅓ rate for the two-slot format, and ¼ rate for the four-slot format. The encoded symbols are provided to block 412, which adjusts length of the encoded symbols for further processing by puncturing/repeating some symbols to generate 48 symbols for the one-slot format, 96 symbols for the two-slot format, and 192 symbols for four-slot format control message. The remaining symbols are provided to a block interleaver 414. The interleaved symbols are then provided to a quadrature-phase shift keying (QPSK) modulator 416. The In-phase (I) and quadrature-phase (Q) outputs of the QPSK modulator 416 are spreaded by a Walsh code (W) in spreaders 418(I) and 418(Q) and provided to a transmitter (not shown).

As described above, the purpose of scrambling the input data 402 should prevent occurrence of repetitive incorrect determination of control message content. Because the content of the control message can be repetitive, so can be the content of the input data 402. Consequently, to prevent occurrence of repetitive incorrect determination of control message content, the scrambling sequence must be time varying. Consequently, in the illustrated embodiment, block 420 provides a metric of a system time. System time is a reference time that base stations and mobile stations both refer to so that they can keep synchronized in time. In one embodiment, the system time metric is expressed in units of slot, (i.e., the slot number of the control message slot—referred to as a slot index) which is to be transmitted by the base station next as illustrated in FIG. 5.

At time $t_1$, the base station determines that a data to a mobile station will be scheduled for transmission next, and another control message 504 is to be sent. Taking into an account processing time necessary to compose the control message 504 and the F-PDCH, the base station determines that the control message can be sent at time $t_2$. The base station then determines the number of slots between the times $t_1$ and $t_2$ and calculates the slot index of the first slot 506(1) of the message 504.

Referring back to FIG. 4, block 420 provides the slot index of the next slot to a sequence generator 422, which generates the 21-bit long scrambling sequence. The sequence generator 422 can comprise e.g., a hash function, a linear function, or any other means known to one skilled in the art, which provides a 21 bit long pseudo-random sequence in response to a number. An exemplary embodiment of the sequence generator is illustrated in FIG. 5.

Figure 6:
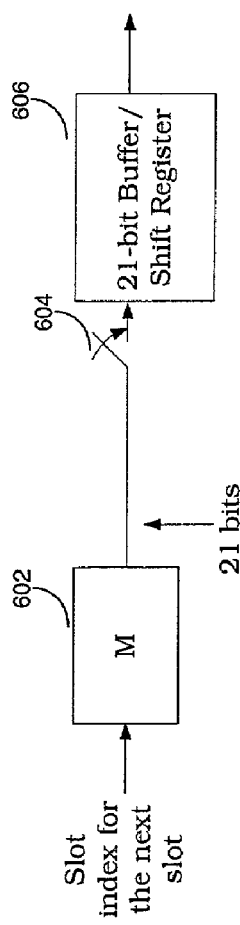
FIG. 6 illustrates a conceptual diagram of an embodiment of a sequence generator.

As illustrated in FIG. 6, the slot index of the next slot is provided to a mapping function 602, which generates a 21 bits long sequence in response. The mapping function 602 can comprise e.g., a hash function, a linear function, or any other means known to one skilled in the art, which provides a 21 bit long pseudo-random sequence in response to the input. At the beginning of a slot, the switch 604 is closed and the 21 bits long sequence is then copied to a 21 bit long buffer/shift register 606. One of ordinary skills in the art understands that switch 604 represents a concept only, and any means accomplishing copying of the scrambling sequence to the buffer/shift register 606 is contemplated. When the base station provides an indication that a first slot of a control message is to start, e.g., slot 606(1) of FIG. 5, therefore, the scrambling is to be performed, the buffer/shift register 606 is clocked and its output is provided to block 404 of FIG. 4.

Mobile Station Processing

Figure 7:
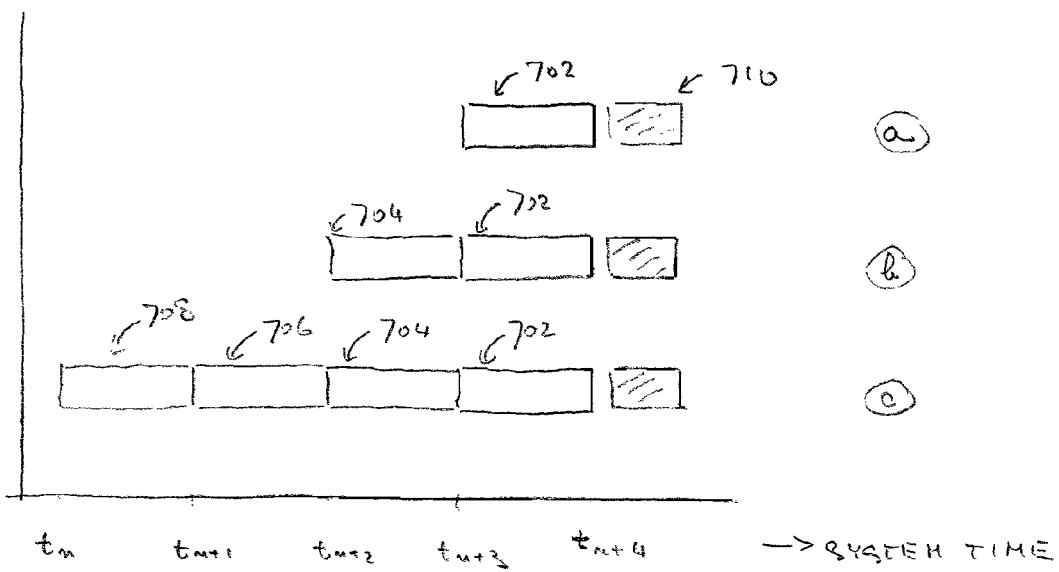
FIG. 7 illustrates a timing diagram for mobile station processing.
Figure 3:
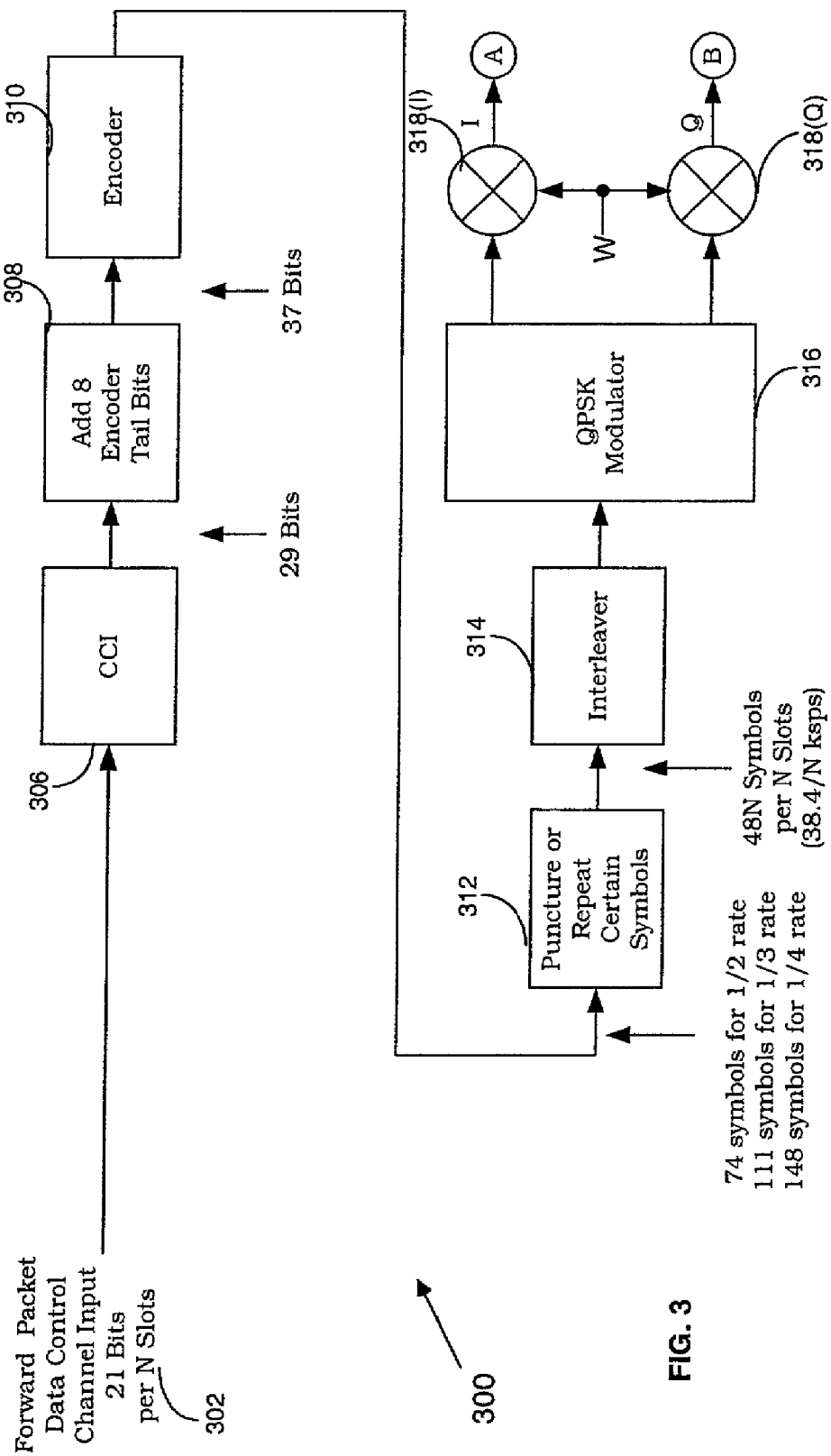
FIG. 3 illustrates a conceptual structure of an exemplary F-PDCCH.

The mobile station processing is described in reference to a timing diagram as illustrated in FIG. 7. Upon receiving the F-PDCCH, the mobile station uses an inverse of the F-PDCCH processing as described in reference to FIG. 3 under the hypothesis that a one-slot 702 control message has been sent to recover the 29 bits comprising the scrambled information bits and the quality indicator bits of the control message. The mobile station then performs the CRC test. If the CRC test is positive, the mobile station unscrambles the slot in time interval 710. (Part a of FIG. 7.) If the CRC test fails, the mobile station uses an inverse of the F-PDCCH processing as described in reference to FIG. 3 under the hypothesis that a two-slot 702, 704 control message has been sent and recovers the 29 bits comprising the scrambled information bits and the quality indicator bits. The mobile station then performs the CRC test. If the CRC test is positive, the mobile station unscrambles the information bits in time interval 710. (Part b of FIG. 7.) If the CRC test fails, the mobile station uses an inverse of the F-PDCCH processing as described in reference to FIG. 3 under the hypothesis that a four-slot 702-710 control message has been sent. The mobile station then recovers the 29 bits sequences comprising the scrambled information bits and the quality indicator bits. The mobile station then performs the CRC test under the hypothesis that a four-slot control message has been sent. If the CRC test is positive, the mobile station unscrambles the information bits in time interval 710 (Part c of FIG. 7.) If the CRC test fails, the mobile station declares that no valid control message is identified and waits till the next slot and repeat the above process.

The apparatus of generating the unscrambling sequence depends on the result of CRC test. In one embodiment, the unscrambling sequence generation is described in reference to FIG. 8.

Figure 8:
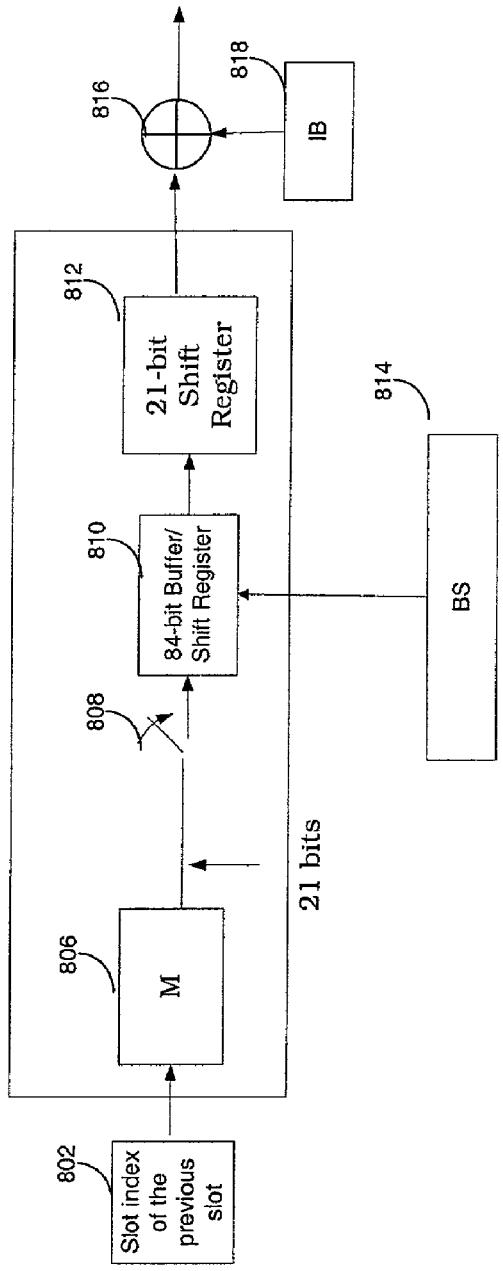
FIG. 8 illustrates a conceptual diagram of one embodiment of generating an unscrambling sequence.

Referring to FIG. 8, at the beginning of a slot, the mobile station determines the time slot index 802 of the previous slot and inputs the determined time slot index into a sequence generator 804. The sequence generator 804 comprises the same mapping function 806 as the sequence generator at the base station. The mapping function 806 generates a 21 bits long pseudo-random sequence in response. Once the sequence is generated, the switch 808 is closed and the 21 bits long sequence is then copied to an 84 bit long buffer/shift register 810. One of ordinary skills in the art understands that switch 808 represents a concept only, and any means accomplishing copying of the scrambling sequence to the buffer/shift register 810 is contemplated. Once the mobile station determines number of slot comprising the control message, the bit selector 814 provides an indication, which bits are to be copied from the buffer/shift register 810 to a 21 bit long buffer/shift register 812. Thus, if the mobile station determines that the control message comprises the 1-slot format, the $1^{st}$-$21^{st}$ bits from the buffer/shift register 810 left (i.e., the newest 21 bits) are copied to the buffer/shift register 812. If the control message comprises the 2-slot format, the $22^{nd}$-$42^{nd}$ bits from the buffer/shift register 810 left (i.e., the next newest 21 bits) are copied to the buffer/shift register 812. If the control message comprises the 4-slot format, $64^{th}$-$84^{th}$ bits from the buffer/shift register 810 left (i.e., the oldest 21 bits) are copied to the buffer/shift register 812. When the mobile station provides an indication that the information bits comprising the control message 818 are provided to block 816, the buffer/shift register 812 is clocked and its output is also provided to block 816. Block 816 performs an inverse operation of bock 404 of FIG. 4, thus unscrambling the information bits of the control message.

One of ordinary skills in the art understands that the embodiment of the sequence generator, referred to in FIG. 8 was given for illustration purposes only. Consequently, other embodiments, assuring that a proper slot index is used to generate the unscrambling sequence are contemplated. Thus, one skilled in the art could contemplate embodiment illustrated in FIG. 9.

Figure 9:
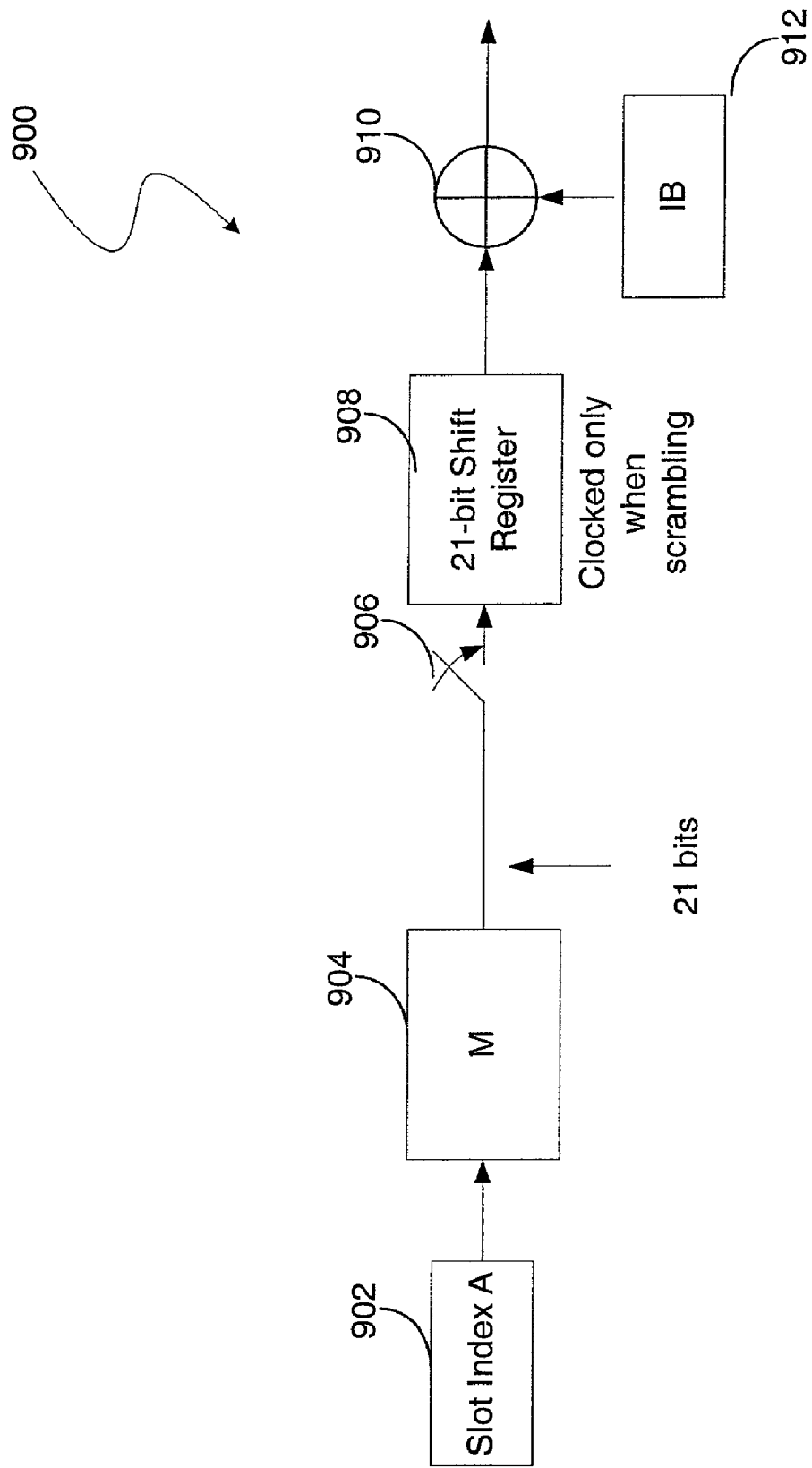
FIG. 9 illustrates a conceptual diagram of another embodiment of generating an unscrambling sequence.

As illustrated in FIG. 9, once the mobile station ascertains number of slot comprising the control message, the mobile station determines which slot index is to be provided from the block 902 to a mapping function 904. The mapping function 904 comprises the same mapping function as the sequence generator at the base station. One skilled in the art recognizes that block 902 may comprise any storage device, a shift register, or an accumulator, capable of performing the described function. Thus, if the mobile station determines that the control message comprises the 1-slot format, the slot index of the slot preceding the current slot is provided to the mapping function 904. If the control message comprises the 2-slot format, the slot index of the slot preceding the current slot by two slots is provided to the mapping function 904. If the control message comprises the 4-slot format, the slot index of the slot preceding the current slot by fours slots is provided to the mapping function 904. The mapping function 904, generates a 21 bits long sequence in response. Once the 21 bits sequence is generated, the switch 906 is closed and the 21 bits long sequence is then copied to a 21 bit long buffer/shift register 908. One of ordinary skills in the art understands that switch 906 represents a concept only, and any means accomplishing copying of the scrambling sequence to the buffer/shift register 908 is contemplated. When the mobile station provides an indication that the scrambled information bits 912 of the control message are provided to block 910, the buffer/shift register 908 is clocked and its output is provided to block 910. Block 910 performs an inverse operation of bock 404 of FIG. 4, thus unscrambling the information bits of the control message.

The description of base station processing referred to the slot index of the first slot of the next message to be sent as the slot index used to determine the scrambling sequence. For consistency reason, the description of mobile station processing referred to the same slot index for deriving the unscrambling sequence. However, one of ordinary skills in the art understands, that any slot of the message can be utilized, as long as both the base station and the mobile station share the knowledge, which slot was used. Consequently, use of any slot of the message is contemplated.

One of ordinary skills in the art understands that a particular embodiment of the F-PDCCH has been described for tutorial purposes. Consequently, other embodiments are contemplated. In particular, other encoders, interleavers, modulators, spreading codes known to one of ordinary skills in the art can be used.

One skilled in the art will appreciate that although the flowchart diagrams are drawn in sequential order for comprehension, certain steps can be carried out in parallel in an actual implementation. Furthermore, unless indicate otherwise, apparatus steps can me interchanged without departing form the scope of the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a apparatus or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method for scrambling information bits in a communications system, comprising:
    determining a scrambling sequence based on a metric of system time, wherein said determining a scrambling sequence includes determining the metric based on a subinterval of a system time interval of a control channel in which the information bits of a control message are to be transmitted; and
    scrambling the information bits of the control message with the determined scrambling sequence in accordance with the metric.

2. The method of claim 1, wherein said determining the metric in accordance with the subinterval of the system time interval in which the information bits are to be transmitted comprises:
    determining the metric in accordance with a first subinterval of the system time interval.

3. The method of claim 1, wherein said determining the scrambling sequence in accordance with the metric of system time comprises:
    performing mapping of the metric on the scrambling sequence.

4. The method of claim 1, wherein said scrambling information bits with the scrambling sequence comprises:
    performing an exclusive-OR of the information bits with the scrambling sequence.

5. A method for unscrambling information bits in a communications system, comprising:
    determining an unscrambling sequence based on a metric of system time, wherein said determining an unscrambling sequence includes determining the metric based on a first subinterval of a system time interval of a control channel preceding a second subinterval of the system time interval by a pre-determined number of subintervals, the second subinterval including information bits of a control message transmitted on the control channel to be unscrambled; and
    unscrambling the information bits of the control message transmitted on the control channel with the determined unscrambling sequence in accordance with the metric.

6. The method as claimed in claim 5, wherein said determining the metric in accordance with a first subinterval of the system time interval preceding a second subinterval of system time interval by a pre-determined number of subintervals comprises:
    determining the first subinterval of the system time interval preceding the second, subinterval of the system time interval by one subinterval.

7. The method as claimed in claim 5, wherein said determining the unscrambling sequence in accordance with the metric comprises:
    performing mapping of the metric on the unscrambling sequence.

8. The method of claim 5, wherein said unscrambling information bits with the scrambling sequence comprises:
    performing an exclusive-OR of the information bits with the unscrambling sequence.

9. An apparatus for scrambling information bits in a communications system, the apparatus comprising:
    means for determining a scrambling sequence based on a metric of system time, wherein said determining a scrambling sequence includes determining the metric based on a subinterval of a system time interval of a control channel in which the information bits of a control message are to be transmitted; and
    means for scrambling the information bits of the control message with the determined scrambling sequence in accordance with the metric.

10. The apparatus of claim 9, wherein said means for determining the metric in accordance with the subinterval of the system time interval in which the information bits are to be transmitted comprises:
    means for determining the metric in accordance with a first subinterval of the system time interval.

11. The apparatus of claim 9, wherein said means for determining the scrambling sequence in accordance with a metric of system time comprises:
    means for performing mapping of the metric on the scrambling sequence.

12. The apparatus of claim 9, wherein said means for scrambling information bits with the scrambling sequence comprises;
    means for performing an exclusive-OR of the information bits with the scrambling sequence.

13. An apparatus for unscrambling information bits in a communications system, the apparatus comprising:
    means for determining an unscrambling sequence based on a metric of system time, wherein said determining an unscrambling sequence includes determining the metric based on a first subinterval of a system time interval of a control channel preceding a second subinterval of the system time interval by a pre-determined number of subintervals, the second subinterval including information bits of a control message transmitted on the control channel to be unscrambled; and
    means for unscrambling the information bits of the control message transmitted on the control channel with the determined unscrambling sequence in accordance with the metric.

14. The apparatus as claimed in claim 13, wherein said means for determining the metric in accordance with a first subinterval of the system time interval preceding a second subinterval of system time interval by a pre-determined number of subintervals comprises:
    means for determining the first subinterval of the system time interval preceding the second subinterval of the system time interval by one subinterval.

15. The apparatus as claimed in claim 13, wherein said means for determining the unscrambling sequence in accordance with the metric comprises:
    means for performing mapping of the metric on the unscrambling sequence.

16. The apparatus of claim 13, wherein said means for unscrambling information bits with the scrambling sequence comprises:
    means for performing an exclusive-OR of the information bits with the unscrambling sequence.

17. An apparatus for scrambling information bits in a communications system, the apparatus comprising:
    an electronic processor programmed to provide:
        a sequence generator for determining a scrambling sequence based on a metric of system time, wherein the sequence generator determines the metric based on a subinterval of a system time interval of a control channel in which the information bits of a control message are to be transmitted; and
        a scrambler for scrambling the information bits of the control message with the determined scrambling sequence in accordance with the interval of the channel.

18. An apparatus for unscrambling information bits in a communications system, the apparatus comprising:
an electronic processor programmed to provide:
a sequence generator for determining an unscrambling sequence based on a first subinterval of a system time interval of a control channel preceding a second subinterval of the system time interval by a predetermined number of subintervals, the second subinterval including information bits of a control message transmitted on the control channel to be unscrambled; and
an unscrambler for unscrambling the information bits of the control message transmitted on the control channel with the determined unscrambling sequence in accordance with the unscrambling sequence.

19. An article, comprising:
a non-transitory computer-readable medium having stored thereon code executable by at least one electronic processor to:
determine a scrambling sequence based on a metric of system time, wherein said determining a scrambling sequence includes determining the metric based on a subinterval of a system time interval of a control channel in which the information bits of a control message are to be transmitted; and
scramble the information bits of the control message with the determined scrambling sequence in accordance with the metric.

20. An article, comprising:
a non-transitory computer-readable medium having stored thereon code executable by at least one electronic processor to:
determine an unscrambling sequence based on a metric of system time, wherein said determining an unscrambling sequence includes determining the metric based on a first subinterval of a system time interval of a control channel preceding a second subinterval of the system time interval by a pre-determined number of subintervals, the second subinterval including information bits of a control message transmitted on the control channel to be unscrambled; and
unscramble the information bits of the control message transmitted on the control channel with the determined unscrambling sequence in accordance with the metric.

* * * * *